US012661962B2

(12) United States Patent
Choi

(10) Patent No.: US 12,661,962 B2
(45) Date of Patent: Jun. 23, 2026

(54) PANEL FASTENING STRUCTURE AND METHOD OF PANEL DOOR FOR VEHICLE

(71) Applicants: Hyundai Motor Company, Seoul (KR); Kia Corporation, Seoul (KR)

(72) Inventor: Je-Won Choi, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 426 days.

(21) Appl. No.: 18/215,944

(22) Filed: Jun. 29, 2023

(65) Prior Publication Data

US 2024/0066961 A1     Feb. 29, 2024

(30) Foreign Application Priority Data

Aug. 31, 2022   (KR) ......................... 10-2022-0109727

(51) Int. Cl.
B60J 5/04           (2006.01)
(52) U.S. Cl.
CPC ........... B60J 5/0469 (2013.01); B60J 5/0413 (2013.01); B60J 5/0415 (2013.01); B60J 5/042 (2013.01); B60J 5/0437 (2013.01); B60J 5/0481 (2013.01)

(58) Field of Classification Search
None
See application file for complete search history.

(56) References Cited

U.S. PATENT DOCUMENTS

| | | | | |
|---|---|---|---|---|
| 4,707,020 | A | * | 11/1987 | Enokida ................ F16B 5/0664 |
| | | | | 296/187.01 |
| 4,743,062 | A | * | 5/1988 | McLaren ............... B60J 5/0463 |
| | | | | 296/202 |
| 5,446,999 | A | * | 9/1995 | Inaba ..................... B60J 5/0469 |
| | | | | 49/502 |
| 5,647,631 | A | * | 7/1997 | Lee ........................ B60J 5/0481 |
| | | | | 296/146.5 |

FOREIGN PATENT DOCUMENTS

| | | | |
|---|---|---|---|
| CZ | 2011396 | * | 1/2013 |
| KR | 10-2019-0055784 A | | 5/2019 |

* cited by examiner

*Primary Examiner* — Joseph D. Pape
(74) *Attorney, Agent, or Firm* — Morgan, Lewis & Bockius LLP

(57) ABSTRACT
A panel fastening structure of the panel door for a vehicle to which circumferences of an external panel and an internal panel are coupled, wherein a first side of the door hinged to a vehicle body includes the external panel and the internal panel fastened by a fastening member, and a second side of the door includes the external panel and the internal panel slidably coupled to each other.

19 Claims, 19 Drawing Sheets

FIG. 3
(Prior Art)

SEC I – I

SEC Ⅱ – Ⅱ

SEC III – III

PANEL FASTENING STRUCTURE AND METHOD OF PANEL DOOR FOR VEHICLE

CROSS-REFERENCE TO RELATED APPLICATION

The present application claims priority to Korean Patent Application No. 10-2022-0109727, filed on Aug. 31, 2022, the entire contents of which is incorporated herein for all purposes by this reference.

BACKGROUND OF THE INVENTION

Field of the Present Disclosure

The present disclosure relates to a door for a vehicle in which a plurality of panels are coupled, and more specifically, to a panel fastening structure and method of a panel door for a vehicle, which may prevent a panel from interfering with a vehicle body by different thermal expansion with different materials.

Description of Related Art

Typically, a side surface of a vehicle 100 is provided with a door for passengers to get on or off.

In FIGS. 1-5, a door 110 is formed by bonding an external panel 111 and an internal panel 112. Stiffness members such as an out belt rail 121, an impact member 122, a hinge reinforce 124, a latch reinforce 125, and a quadrant reinforce 128 are added between the external panel 111 and the internal panel 112, increasing the stiffness of the door 110.

The door 110 is typically formed by processing a metal plate, processing the external panel 111 and the internal panel 112 through a press mold, and then bonding the circumference thereof through a hemming process and a hemming sealer 113.

Because the external panel 111 and the internal panel 112 are processed through a large press, the external panel 111 and the internal panel 112 processed by the press are suitable for mass production. However, there is a problem in that when diversified small-quantity production vehicle models, such as a purpose built vehicle (PBV), are developed, it takes a lot of time and money to develop.

To manufacture a new mold, it takes a lot of time and money, and to recover the time and money, the same vehicle model needs to be mass-produced. Therefore, it takes a lot of time and money to re-manufacture a mold for each vehicle model in the diversified small-quantity production vehicle model, which causes an increase in a production cost. Furthermore, there is a problem in that a new mold needs to be developed even for a small design change, such as a change in a length of the door 110.

To solve these problems, any one of the external panel 111 and the internal panel 112 is provided as a plastic panel manufactured through injection processing. Therefore, it is possible to reduce a mold investment cost, a development period, and the number of components, responding to the diversified small-quantity production.

When the external panel 111 and the internal panel 112 are respectively provided as a plastic panel and a metal panel, unlike a case in which both of the external panel 111 and the internal panel 112 are provided as the metal panels, the door 110 interferes with the vehicle body due to thermal deformation when the door 110 is opened or closed, causing a malfunction. When both of the external panel 111 and the internal panel 112 are the metal panels, the circumference of the door 110 is plastically deformed through the hemming process and the hemming sealer 113. Therefore, the external panel 111 and the internal panel 112 thermally expand together even in a high-temperature environment such as a hot summer season.

However, when the external panel 111 and the internal panel 112 are provided as a combination of the plastic panel and the metal panel, their circumferences may not be bonded by the hemming process, and thus the thermal deformation of the circumferences of the external panel 111 and the internal panel 112 occurs differently.

As shown in FIG. 4, because a parting gap g is formed between an end portion of the door 110 and a fender 131, the door 110 may be opened or closed by rotating about a hinge axis 134 with respect to a hinge 133.

However, when the external panel 111 thermally expands due to predetermined temperature, there is a problem in that a parting gap g' is reduced, causing the interference with the vehicle body such as the fender 131 when the door 110 rotates. It causes the malfunction of the door.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a panel fastening structure and method of a panel door for a vehicle, which can improve the weight loss and design responsiveness by forming any one of an external panel and an internal panel as a plastic panel and also prevent a malfunction of a door caused by a thermal deformation difference due to a temperature change.

In a panel fastening structure of a panel door for a vehicle according to an exemplary embodiment of the present disclosure in which circumferences of an external panel and an internal panel are coupled, wherein a first side of the door hinged to a vehicle body includes the external panel and the internal panel fastened by a fastening member, and a second side of the door includes the external panel and the internal panel slidably coupled to each other.

A first touch boss may be provided to protrude from one side of any one of the external panel and the internal panel, a through hole may be formed in one side of the other of the external panel and the internal panel, and the external panel and the internal panel may be fastened by a fastening bolt passing through the through hole and fastened to the first touch boss.

A front flange may be formed to be bent to the outside of the vehicle on the portion of the internal panel where the internal panel is fastened to the external panel, a fastening portion may be formed stepwise with the front flange from the front flange toward the other side of the external panel, the through hole may be formed in the fastening portion, and the first touch boss may be provided on an internal surface of the external panel.

On the one side of the door, the external panel and the internal panel may be fastened at an interval in a height direction of a vehicle by the fastening bolt.

A locking jaw protruding toward an interior of a vehicle may be formed on one end portion of the external panel, and one end portion of the internal panel may include the external panel and the internal panel fastened to be in contact with the locking jaw.

A second touch boss may be provided to protrude from the other side of any one of the external panel and the internal panel, a reinforcement member may be bonded to the other side of the other of the external panel and the internal panel, and the reinforcement member may be slidably coupled to the second touch boss.

The reinforcement member may be bonded to the internal panel, and a guide hole formed of a slot is formed in a longitudinal direction of a vehicle, the second touch boss may be formed on the external panel, and a guide pin fixed to the second touch boss and passing through the guide hole may be provided.

The guide hole may be formed lengthily in the longitudinal direction of the vehicle, and a rear end portion of the guide hole may be formed to be greater than a diameter of the guide pin.

A clip for elastically supporting the reinforcement member to the second touch boss may be provided on the guide pin.

A locking protrusion for limiting the movement of the reinforcement member in an axial direction of the guide pin may be provided on the guide pin.

A rear flange may be formed to be bent to the outside of a vehicle on the other end portion of the internal panel, a gripping portion for gripping the rear flange may be formed on the other end portion of the external panel, and the rear flange may be fitted into the gripping portion.

A rubber for allowing the rear flange to be in contact with the external panel may be provided inside the gripping portion.

A protrusion may be formed on the rear flange at an interval from the other end portion of the internal panel, and a coupling groove coupled to the protrusion may be formed in the gripping portion.

A stopper formed to protrude inside the gripping portion and for allowing the rear flange to be in contact with the external panel may be formed.

A step portion formed stepwise at an interval on the rear flange may be provided.

The gripping portion may be formed at an interval in a height direction of a vehicle.

The external panel may be formed as a plastic panel, and the internal panel may be formed as a metal panel.

Meanwhile, a panel fastening method of a panel door for a vehicle includes an internal panel positioning operation of positioning an internal panel at a predetermined position, an external panel loading operation of moving an external panel in a width direction of a vehicle and loading the external panel to be close to the internal panel, an external panel provisional fastening operation of seating the external panel on the internal panel, an external panel moving operation of moving the external panel in a longitudinal direction of the vehicle to position the external panel at a fastening position with respect to the internal panel, and a fastening completion operation of fastening one sides of the external panel and the internal panel by a fastening bolt.

According to the panel fastening structure and method of the panel door for a vehicle according to an exemplary embodiment of the present disclosure including the above configuration, it is possible to smoothly couple the external panel and the internal panel even when the materials of the external panel and the internal panel are different.

Furthermore, it is possible to secure the consistent hinge connecting point even when the thermal deformation is caused by the temperature change, preventing the door interference phenomenon due to the reduction in the parting gap with respect to the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

Figure 3:
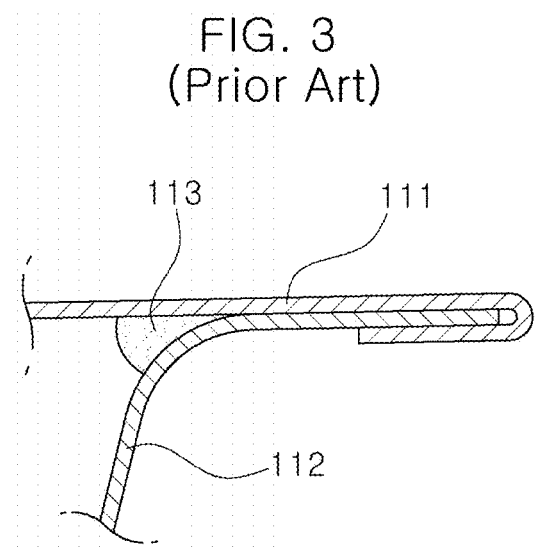

FIG. 3 is a cross-sectional view showing a state in which the external panel and the internal panel are assembled on an end portion of a door according to the related art.

FIG. 17 and FIG. 18 are cross-sectional views showing another exemplary embodiment of a coupling method between a reinforcement member and a guide pin on the other end portion of the door to which the panel fastening structure of the panel door for a vehicle according to an exemplary embodiment of the present disclosure is applied.

Figure 1:
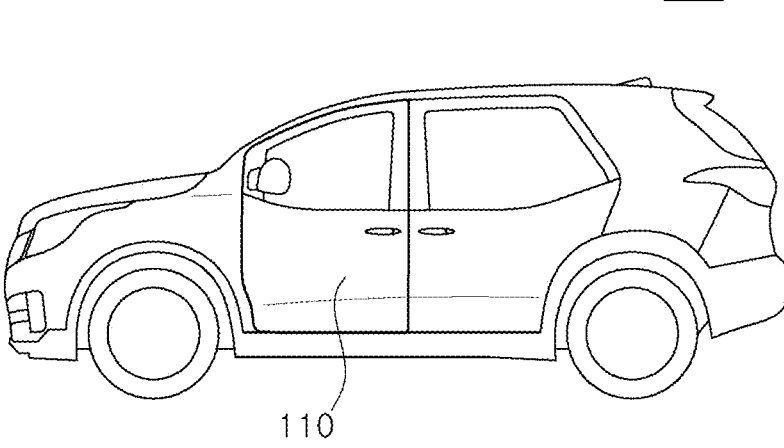
FIG. 1 is a side view showing a side surface of a vehicle.
Figure 2:
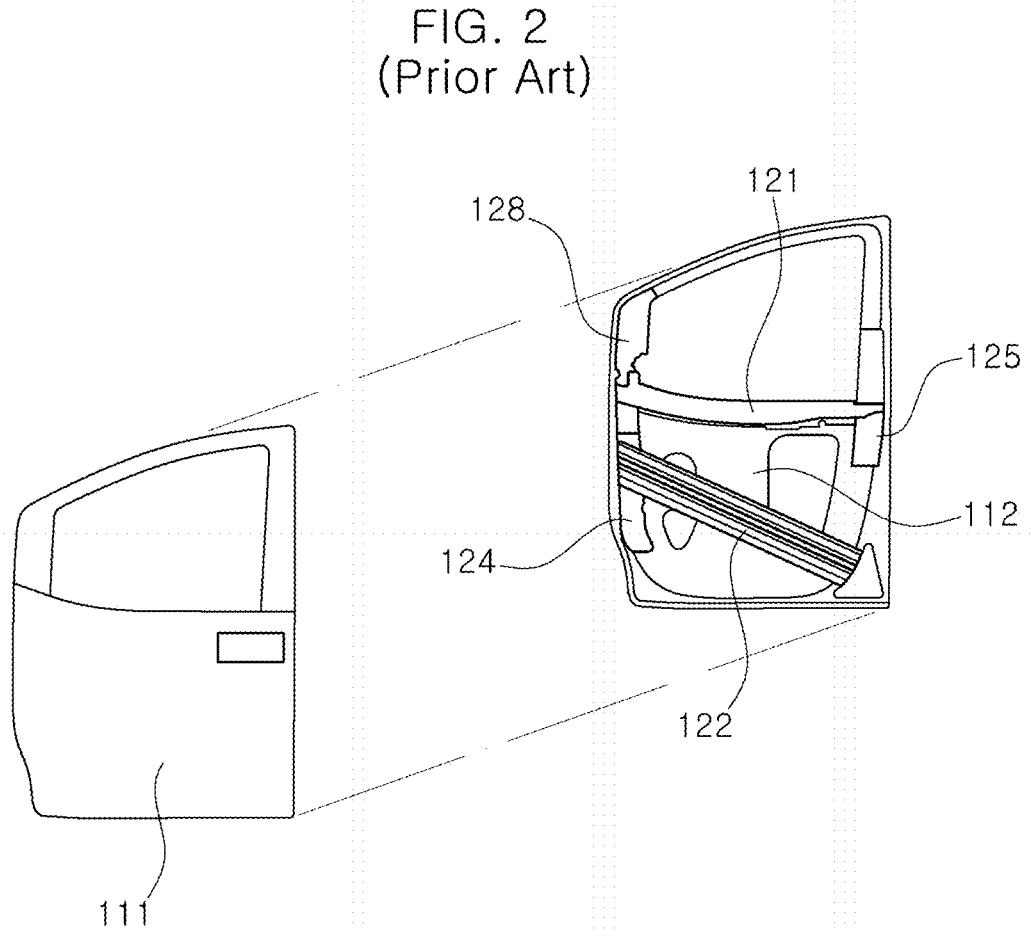
FIG. 2 is an exploded perspective view showing a state in which an external panel and an internal panel are assembled according to the related art.
Figure 4:
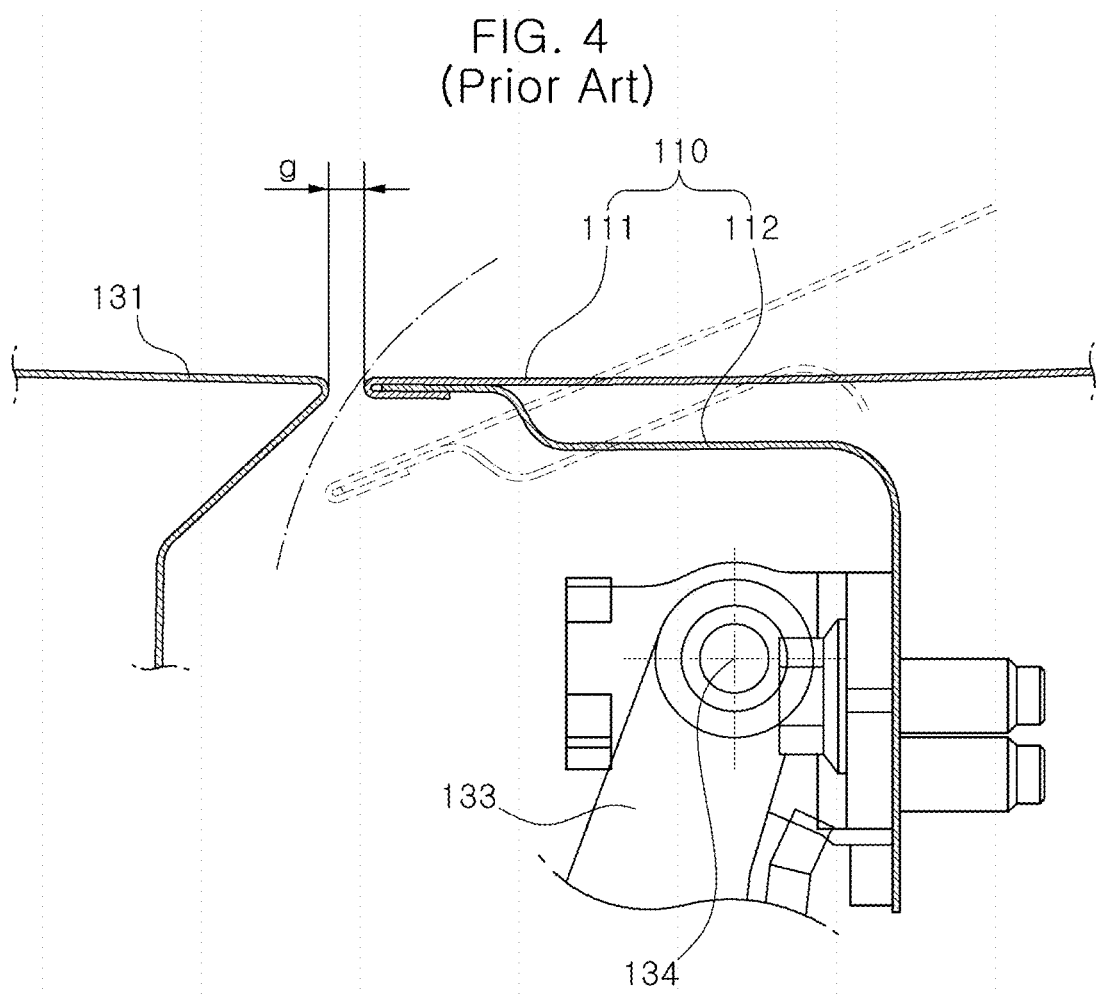
FIG. 4 is a cross-sectional view showing an opened or closed state of the door according to the related art.
Figure 5:
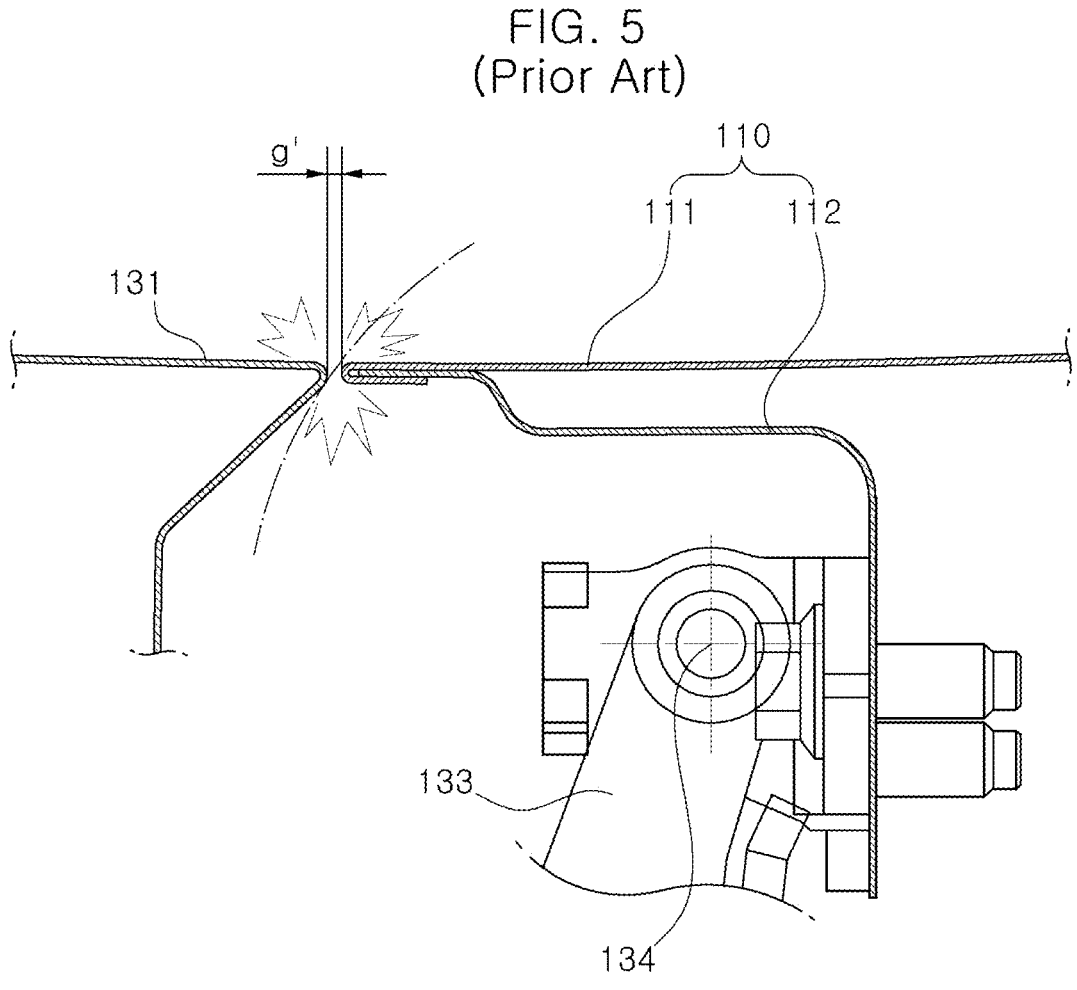
FIG. 5 is a cross-sectional view showing a state in which interference occurs upon opening or closing in a state in which the external panel thermally expands in the door according to the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a panel fastening structure and method of a panel door for a vehicle according to an exemplary embodiment of the present disclosure will be described in detail with reference to the accompanying drawings.

In the panel fastening structure of the panel door for a vehicle according to an exemplary embodiment of the present disclosure in which circumferences of an external panel and an internal panel are coupled, one side of a door 10 hinged to a vehicle body includes the external panel 11 and the internal panel 12 fastened by a fastening member 32, and the other side of the door 10 includes the external panel 11 and the internal panel 12 slidably coupled.

Figure 6:
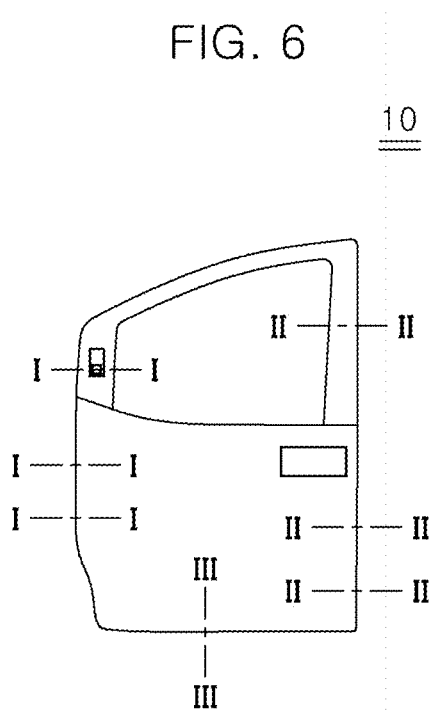
FIG. 6 is a front view of a door to which a panel fastening structure of a panel door for a vehicle according to an exemplary embodiment of the present disclosure is applied.

FIG. 6 shows a front view of the panel door for a vehicle to which the panel fastening structure of the panel door for a vehicle according to an exemplary embodiment of the present disclosure is applied.

The door 10 includes the external panel 11 and the internal panel 12 and is formed by bonding the circumferences of the external panel 11 and the internal panel 12.

Any one of the external panel 11 and the internal panel 12 is formed as a plastic panel, and the other is formed as a metal panel. For example, by manufacturing the external panel 11 as the plastic panel, it is possible to achieve weight loss and easily respond to a design change of the door 10.

Meanwhile, as the external panel 11 and the internal panel 12 are formed as a combination of the plastic and metal panels, respectively, which are different materials, the amounts of thermal expansion of the external panel 11 and the internal panel 12 are different when a temperature changes, and thus a parting gap between the door 10 and the vehicle body is reduced, causing the interference with the vehicle body when the door 10 is opened or closed.

To solve the problem, there is provided a structure in which the one side of the door 10 hinged to the vehicle body may constantly maintain the parting gap g, and the other side which is an opposite side thereof may absorb the thermal expansion of the external panel 11.

Typically, because the door 10 includes a front end portion hinged to the vehicle body and rotates about the front end portion, the one side of the door 10 where the parting gap g is kept constant becomes one end portion of the door positioned on the front, and a portion of the external panel 11 absorbing thermal expansion becomes the other end portion of the door 10.

Therefore, the one side of the door 10 hinged to the vehicle body includes the external panel 11 and the internal panel 12 fastened by the fastening member 32, and the other side of the door 10 includes the external panel 11 and the internal panel 12 slidably coupled.

First, a fastening structure of one side of the door 10, that is, a portion where the door 10 is hinged to the vehicle body will be described below. On the one side of the door 10, the external panel 11 and the internal panel 12 are fastened through the fastening member 32 so that the external panel 11 and the internal panel 12 do not move relatively with respect to each other even when the temperature changes.

Figure 7:
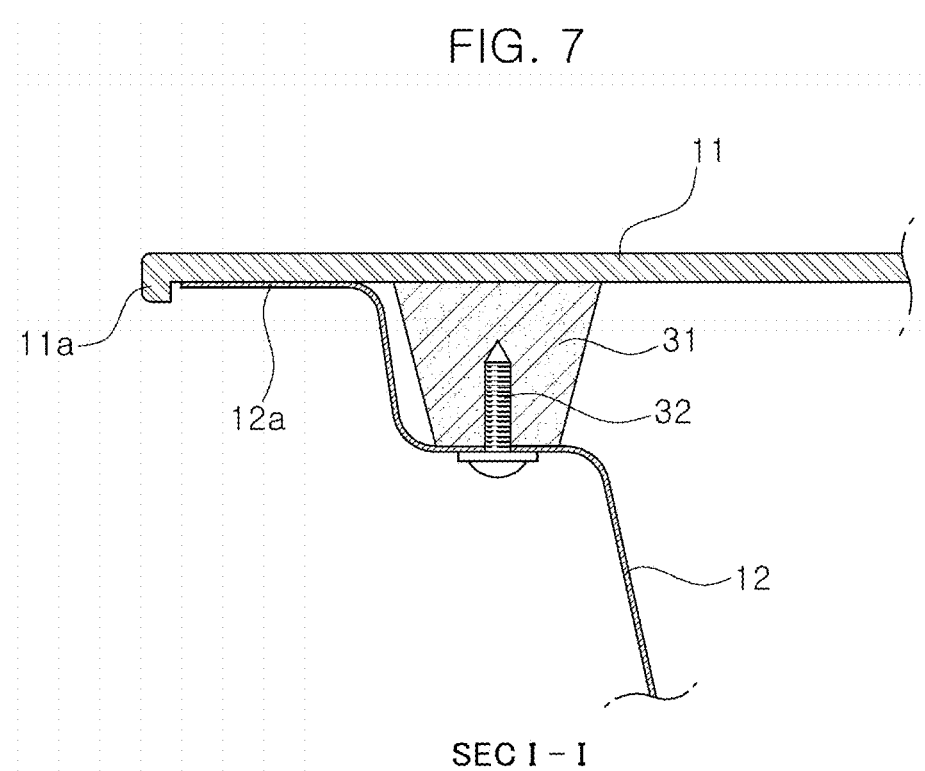
FIG. 7 is a cross-sectional view along line I-I in FIG. 6.

On the one side of the door 10, a first touch boss 31 is provided to protrude from any one of the external panel 11 and the internal panel 12, and a through hole 12ba is formed in the other of the external panel 11 and the internal panel 12. For example, as shown in FIG. 7, the first touch boss 31 is formed on an internal surface of the external panel 11, and the through hole 12ba is formed in the internal panel 12 side. The fastening member passes through the through hole 12ba and is fastened to a fastening hole 31a.

The first touch boss 31 is formed at a predetermined height and formed integrally with the external panel 11 on the internal surface of the external panel 11. The fastening hole 31a to which the fastening bolt 32 is fastened is formed in the first touch boss 31.

A front flange 12a is formed to be bent to the outside of the vehicle on the portion of the internal panel 12 where the internal panel 12 is fastened to the external panel 11, and a fastening portion 12b is formed stepwise with the front flange 12a from the front flange 12a toward the other side of the external panel 11, that is, the other end portion of the door 10. The front flange 12a is connected to a main body of the internal panel 12 through the fastening portion 12b. Furthermore, a step between the fastening portion 12b and the front flange 12a becomes a height of the first touch boss 31. The through hole 12ba through which the fastening bolt 32 passes is formed in the fastening portion 12b.

The fastening bolt 32 is provided as the fastening member for fastening the external panel 11 and the internal panel 12, and the fastening bolt 32 passes through the through hole 12ba and is fastened to the first touch boss 31. Therefore, on one side of the door 10, the external panel 11 and the internal panel 12 do not move relatively with respect to each other, and thus the parting gap g is kept constant.

A locking jaw 11a protruding toward the interior of the vehicle is formed on one end portion of the external panel 11, and one end portion of the internal panel 12 includes the external panel 11 and the internal panel 12 fastened to be in contact with the locking jaw 11a. In other words, the internal panel 12 is fastened to the external panel 11 in a state in which the one end portion of the internal panel 12 is caught to the locking jaw 11a.

A configuration of limiting a position of the one end portion of the internal panel 12 by the locking jaw 11a is applied to the entire section or applied to a partial section, limiting the position of the one end portion of the internal panel 12.

By fastening the external panel 11 and the internal panel 12 by the fastening blot 32 and restricting the position of the internal panel 12 by the locking jaw 11a, the one end portion of the door 10 constantly maintains the parting gap g with the vehicle body side, for example, a fender while maintaining a constant distance with respect to the hinge.

On the one side of the door 10, that is, the one end portion of the door 10, the above fastening structure is applied at an interval in a height direction of the vehicle. In other words, the structure of fastening the external panel 11 and the internal panel 12 using the fastening bolt 32 is applied at an interval in the height direction of the vehicle in the door 10 (e.g., a portion along I-I in FIG. 6).

Figure 9:
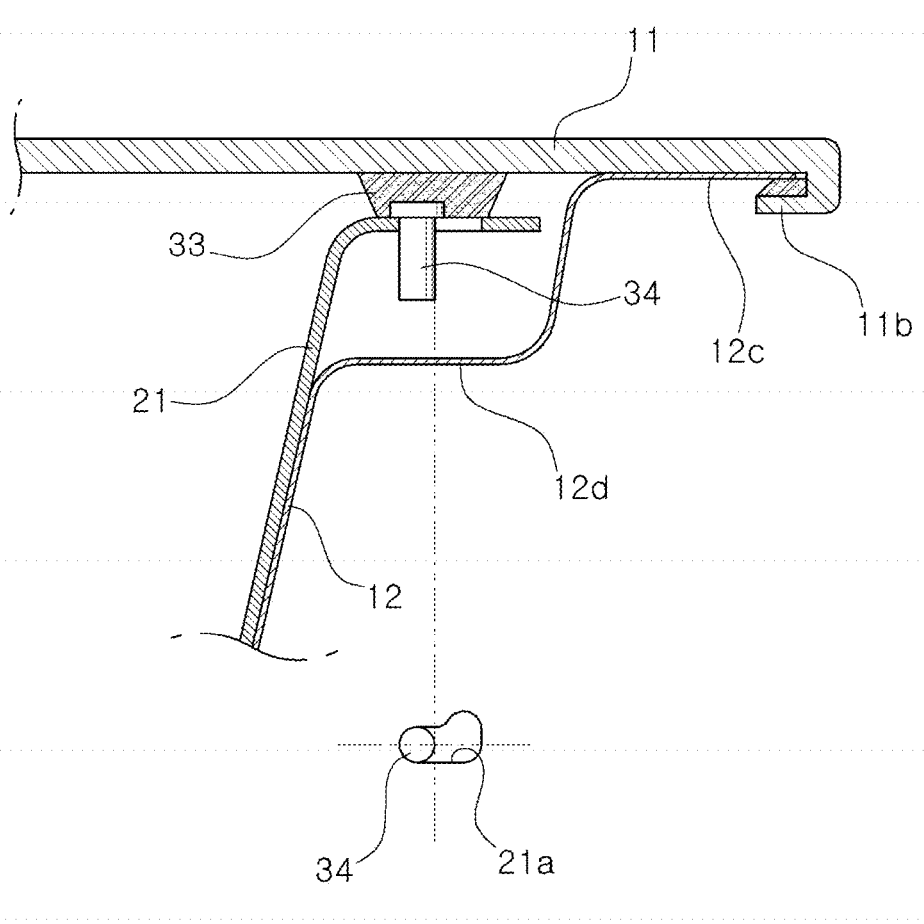
FIG. 9 is a cross-sectional view along line II-II in FIG. 6.

FIG. 9 shows a structure in which the external panel 11 and the internal panel 12 are fastened on the other end portion of the door 10.

On the other side of the door 10, a second touch boss 33 is provided to protrude from any one of the external panel 11 and the internal panel 12, the other of the external panel 11 and the internal panel 12 is bonded to a reinforcement member 21, and the reinforcement member 21 is slidably coupled to the second touch boss 33.

The second touch boss 33 is provided on the internal surface of the external panel 11, and the reinforcement member 21 is formed to be bonded to the internal panel 12.

On the other side of the door 10, the second touch boss 33 and the reinforcement member 21 are slidably coupled, and on the other end portion of the door 10, the other end portion of the internal panel 12 is fitted into a gripping portion 11b formed on the external panel 11, and thus the external panel 11 and the internal panel 12 are fastened.

Like the first touch boss 31, the second touch boss 33 is provided on the internal surface of the external panel 11 at a predetermined height. The first touch boss 31 and the second touch boss 33 limit positions of the external panel 11 and the internal panel 12 in a width direction of the vehicle.

A guide pin 34 is fixed to the second touch boss 33. The guide pin 34 protrudes toward the internal panel 12.

The reinforcement member 21 is bonded to one side of the internal panel 12. The reinforcement member 21 is bonded to the internal panel 12 by welding. The reinforcement member 21 includes a guide hole 21a formed in a face parallel to a bent portion 12d formed on the internal panel 12 and the guide pin 34 passing through the guide hole 21a so that the internal panel 12 and the external panel 11 may move relatively with respect to each other.

The internal panel 12 includes a structure that includes a rear flange 12c formed on the other end portion thereof and the bent portion 12d formed stepwise with the rear flange 12c to form the main body of the rear flange 12c, the bent portion 12d, and the internal panel 12 from the other end portion. The bent portion 12d is formed stepwise with the rear flange 12c and formed at a regular interval from the reinforcement member 21, securing a space for accommodating the guide pin 34.

Meanwhile, the guide hole 21a includes a long hole shape formed in a longitudinal direction of the vehicle. A front end portion of the guide hole 21a is formed to include a width corresponding to a diameter of the guide pin 34, preventing a clearance with respect to the height direction of the vehicle in a state in which the external panel 11 and the internal panel 12 are completely coupled.

However, a rear end portion of the guide hole 21a is formed to have a width greater than the diameter of the guide pin 34 so that the guide pin 34 may be easily inserted into the guide hole 21a.

The reinforcement member 21 may become a latch reinforce in which a latch is provided in the door 10 and support the installation of the latch and the fastening of the external panel 11 and the internal panel 12 at the same time. Alternatively, the reinforcement member 21 is provided as a separate element and is used for fastening the external panel 11 and the internal panel 12.

On the other end portions of the external panel 11 and the internal panel 12, that is, the other end side of the door 10, the gripping portion 11b is formed on the external panel 11 so that the external panel 11 and the internal panel 12 maintain the coupled state.

The gripping portion 11b prevents the other end portion of the internal panel 12 from being separated from the other end portion of the external panel 11 when the external panel 11 and the internal panel 12 are coupled.

The gripping portion 11b is formed to surround the other end portion of the internal panel 12, that is, the other end portion of the rear flange 12c formed on the internal panel 12 on the other end portion of the external panel 11. The gripping portion 11b surrounds the other end portion of the rear flange 12c, and the rear flange 12c is fitted into the gripping portion 11b, preventing a phenomenon in which the other end portion of the internal panel 12 is separated from the other end portion of the external panel 11.

However, the gripping portion 11b is formed in a partial section in the height direction of the vehicle on the other end portion of the external panel 11. The gripping portion 11b may also be formed in the entire section in the height direction of the vehicle on the other end portion of the external panel 11, but the gripping portion 11b is formed at an interval in the height direction of the vehicle to facilitate the coupling between the external panel 11 and the internal panel 12 and prevent the separation of the internal panel 12.

A rubber 35 for allowing the internal panel 12 to be in close contact with the external panel 11 is provided on the gripping portion 11b. The rubber 35 elastically supports the rear flange 12c inserted into the gripping portion 11b to the internal surface of the external panel 11, and thus the internal panel 12 is in close contact with the internal surface of the external panel 11. The rubber 35 is formed to be inclined on an inlet side of the gripping portion 11b so that the rear flange 12c may be easily inserted.

Figure 13:
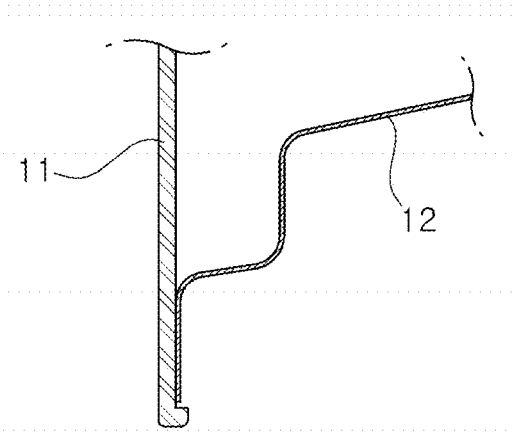
FIG. 13 is a cross-sectional view along line in FIG. 6.

Meanwhile, a lower end portion of the door 10 is coupled as shown in FIG. 13. In other words, in a state in which the locking jaw is formed on a lower end portion of the external panel 11 and the downward movement of the lower end portion of the internal panel 12 is limited by the locking jaw, the lower end portion of the door 10 includes a structure in which the external panel 11 and the internal panel 12 are coupled to each other.

Figure 14:
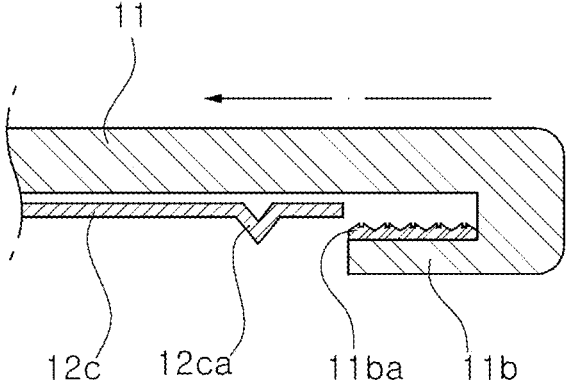
FIG. 14, FIG. 15 and FIG. 16 are cross-sectional views showing other embodiments in which the external panel grips the internal panel on the other end portion of the door to which the panel fastening structure of the panel door for a vehicle according to an exemplary embodiment of the present disclosure is applied.
Figure 15:
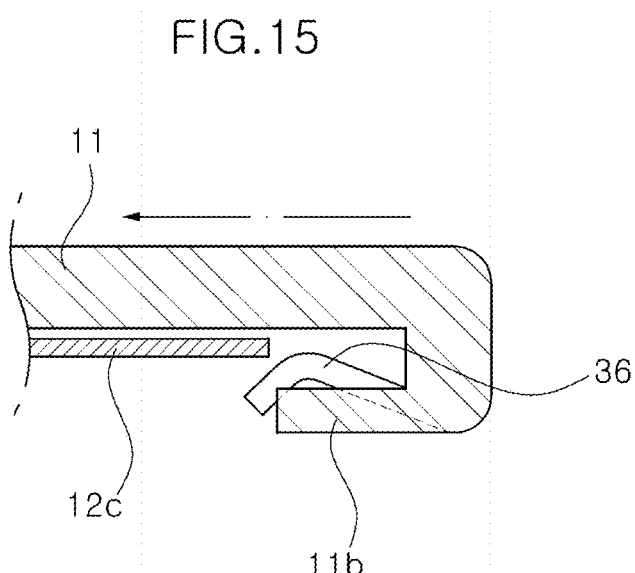
Figure 16:
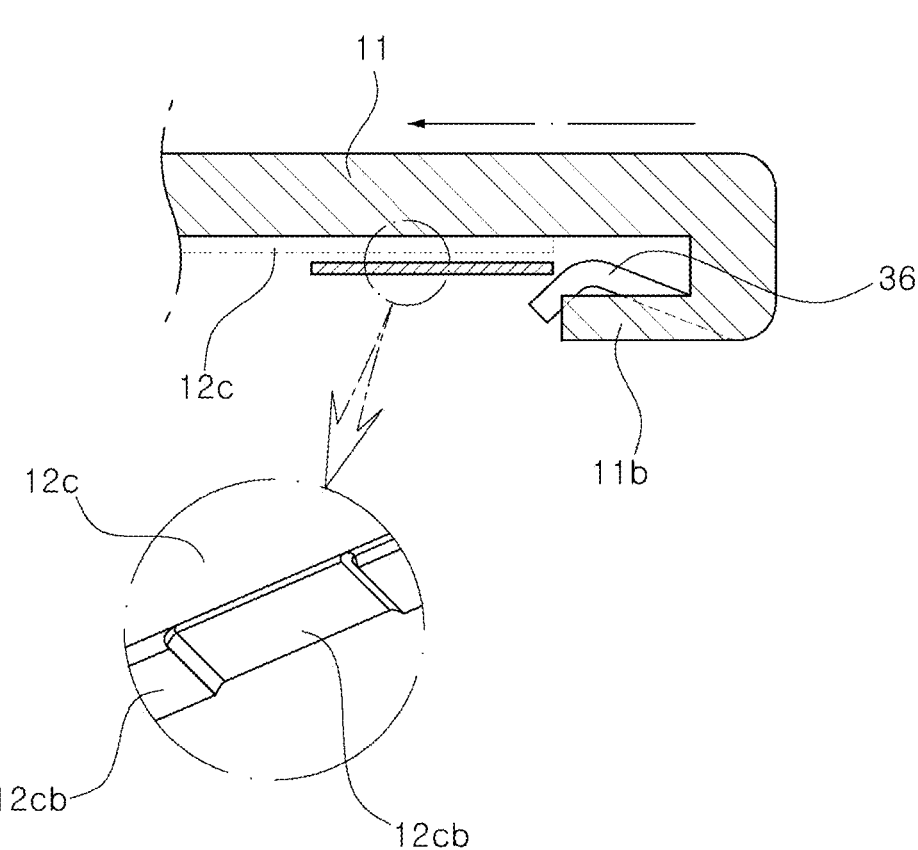

FIG. 14, FIG. 15 and FIG. 16 show another exemplary embodiment in which the internal panel 12 is fixed to the gripping portion 11b.

As shown in FIG. 14, a protrusion 12ca is formed on the rear flange 12c, and a coupling groove 11ba is repeatedly formed in the gripping portion 11b. Because the protrusion 12ca is formed at an interval from the other end portion of the internal panel 12 and the coupling groove 11ba is repeatedly formed in the gripping portion 11b, the rear flange 12c is not separated from the gripping portion 11b when the protrusion 12ca is fitted into the coupling groove 11ba, and thus the external panel 11 and the internal panel 12 may be firmly coupled. The protrusion 12ca may be repeatedly formed.

Meanwhile, a stopper 36 may be formed inside the gripping portion 11b, and the stopper 36 may elastically support the rear flange 12c to the internal surface of the external panel 11, preventing the rear flange 12c from being separated from the gripping portion 11b (see FIG. 15). Because the stopper 36 is formed to protrude inside the gripping portion 11b, the stopper 36 allows the rear flange 12c to be in close contact with the internal surface of the external panel 11.

A step portion 12cb formed stepwise on the end portion of the rear flange 12c is provided to further increase the coupling force between the gripping portion 11b and the rear flange 12c (see FIG. 16). When the rear flange 12c is fitted into the gripping portion 11b, the coupling force of the rear flange 12c is further increased inside the gripping portion 11b by the step portion 12cb.

Figures 17, 18:
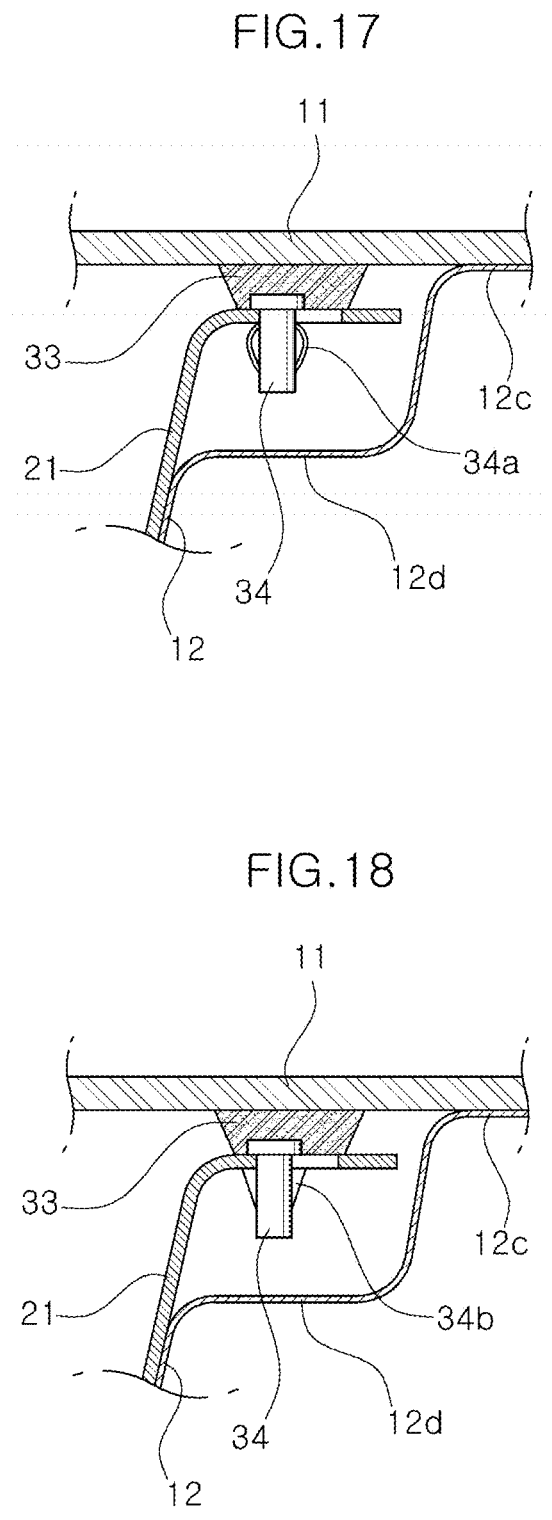

FIG. 17 and FIG. 18 show another configuration for increasing the fastening force between the guide pin 34 and the reinforcement member 21.

Referring to FIG. 17, a clip 34a is provided on the guide pin 34 so that the clip 34an elastically supports the reinforcement member 21 to the second touch boss 33. The clip 34a is formed to be greater than a diameter of the guide hole 21a so that the clip 34an elastically supports a bottom surface of the reinforcement member 21 when the clip 34a passes through the guide hole 21a. The reinforcement member 21 is elastically supported to the second touch boss 33 by the clip 34a, increasing a fastening force and preventing the vibration caused by the separation of the reinforcement member 21 from the second touch boss 33.

FIG. 18 shows a configuration in which a locking protrusion 34b is formed on the guide pin 34, and the locking protrusion 34b restrains the reinforcement member 21. When the guide pin 34 passes through the guide hole 21a, the locking protrusion 34b limits the movement of the reinforcement member 21 in an axial direction of the guide pin 34 from the guide pin 34. Therefore, like the clip 34a, the locking protrusion 34b can also increase the fastening force of the reinforcement member 21 and prevent the vibration caused by the separation of the reinforcement member 21 from the second touch boss 33.

Figure 19:
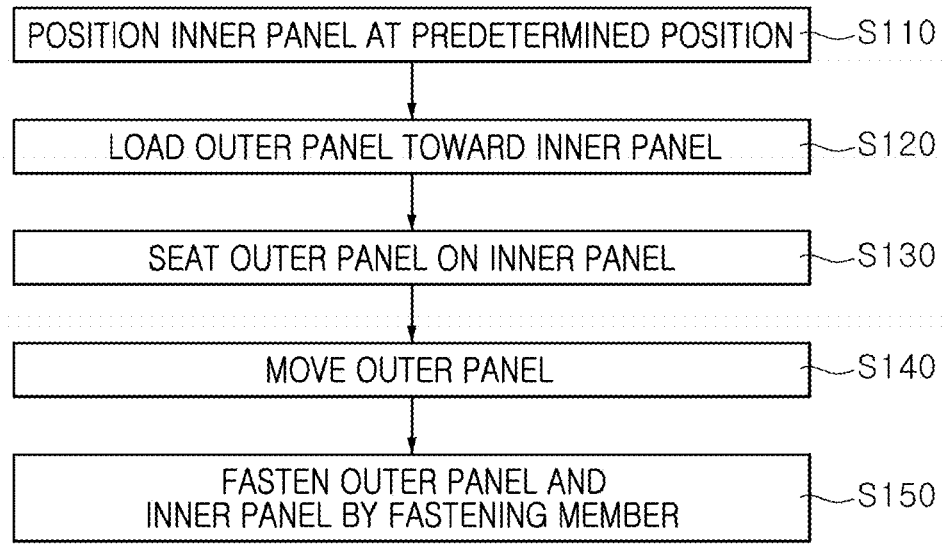
FIG. 19 is a flowchart showing a method of fastening the panel of the panel door for a vehicle according to an exemplary embodiment of the present disclosure.

FIG. 19 shows a panel fastening method of a panel door for a vehicle according to an exemplary embodiment of the present disclosure.

The panel fastening method of the panel door for a vehicle according to an exemplary embodiment of the present disclosure relates to a process of fastening the external panel 11 and the internal panel 12 to form the panel fastening structure of the panel door for a vehicle described above.

The panel fastening method of the panel door for a vehicle according to an exemplary embodiment of the present disclosure includes an internal panel positioning operation S110 of positioning the internal panel at a predetermined position, an external panel loading operation S120 of moving the external panel 11 in the width direction of the vehicle and loading the external panel 11 to be adjacent to the internal panel 12, an external panel provisional fastening operation S130 of seating the external panel 11 on the internal panel 12, an external panel moving operation S140 of moving the external panel 11 in the longitudinal direction of the vehicle to position the external panel 11 at a fastening position with respect to the internal panel 12, and a fastening completion operation S150 of fastening one sides of the external panel 11 and the internal panel 12 by the fastening bolt 32.

In the internal panel positioning operation S110, to fasten the external panel 11 and the internal panel 12, the internal panel 12 is first positioned at the predetermined position. The internal panel 12 is bonded to the reinforcement member 21.

Figure 8A:
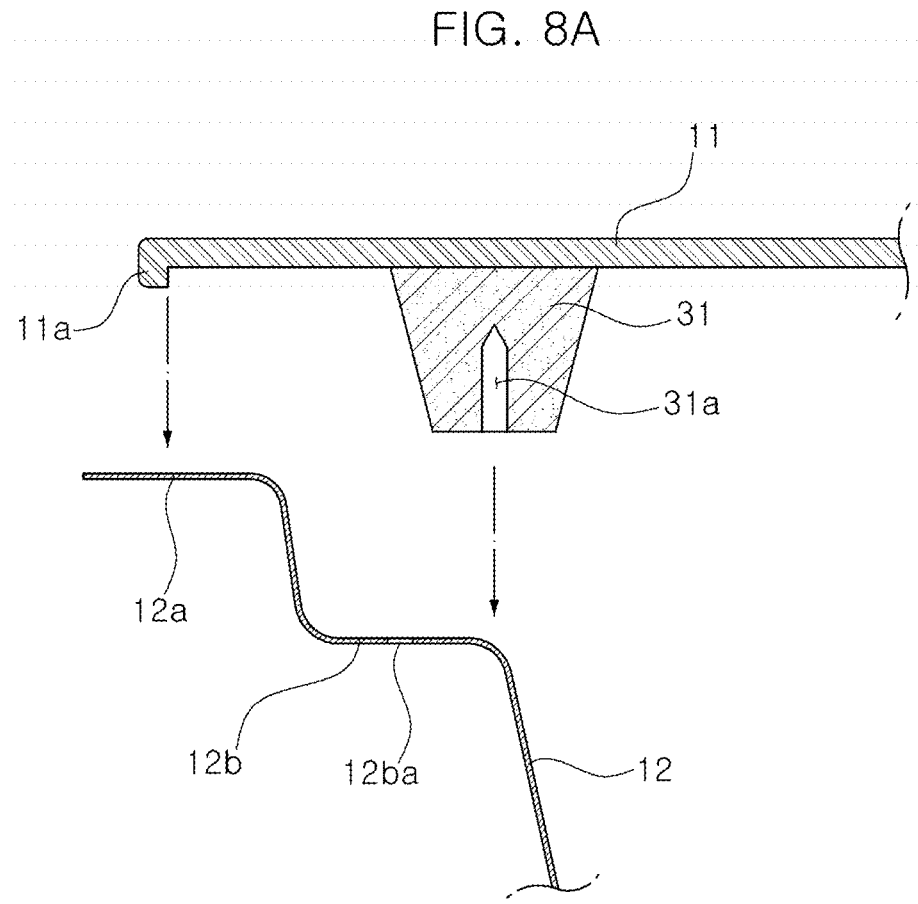
FIG. 8A, FIG. 8B and FIG. 8C are cross-sectional views showing a process of fastening one end portion of the door to which the panel fastening structure of the panel door for a vehicle according to an exemplary embodiment of the present disclosure is applied.
Figure 10A:
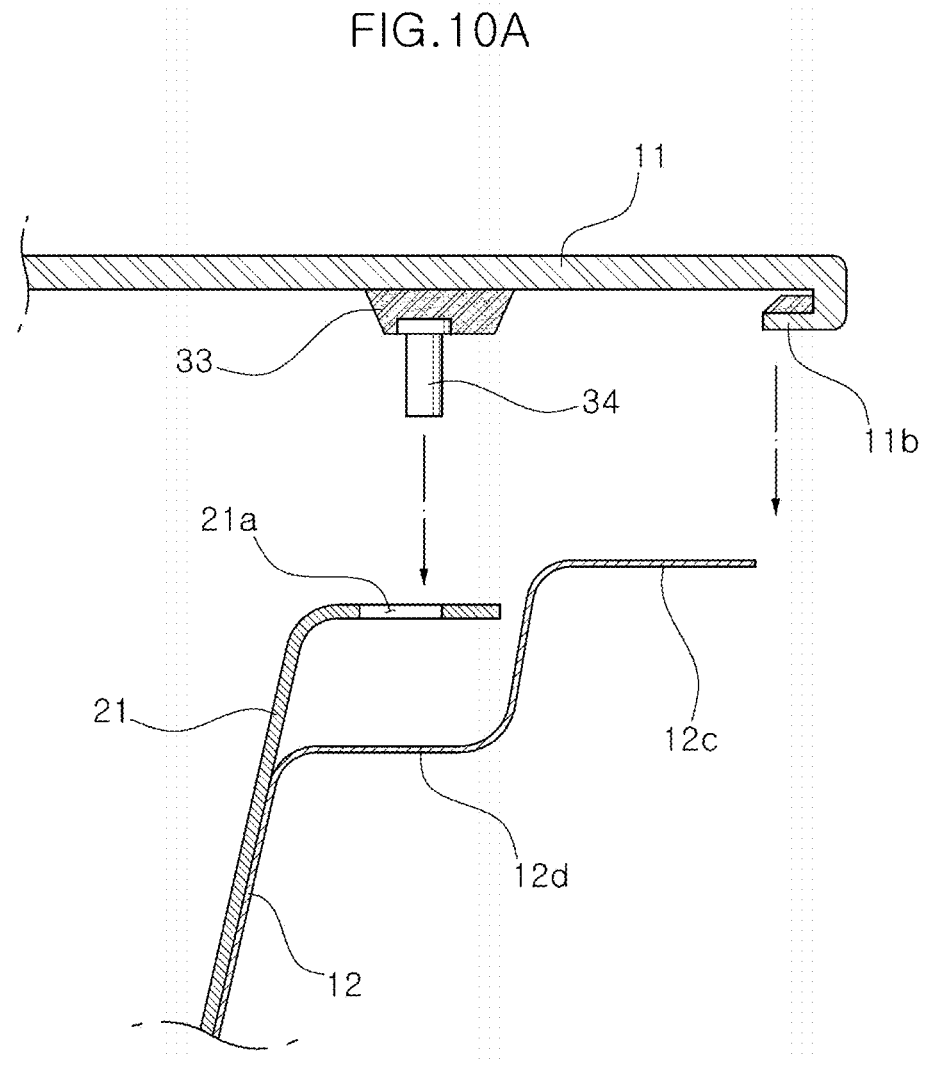
FIG. 10A and FIG. 10B are cross-sectional views showing a process of fastening the other end portion of the door to which the panel fastening structure of the panel door for a vehicle according to an exemplary embodiment of the present disclosure is applied.

In the external panel loading operation S120, to fasten the external panel 11 including the first touch boss 31 and the second touch boss 33 to the internal panel 12, the external panel 11 is loaded to be adjacent to the internal panel 12 (see FIGS. 8A and 10A). The internal surface of the external panel 11 is moved toward the external surface of the internal panel 12 in the width direction of the vehicle.

Figure 8B:
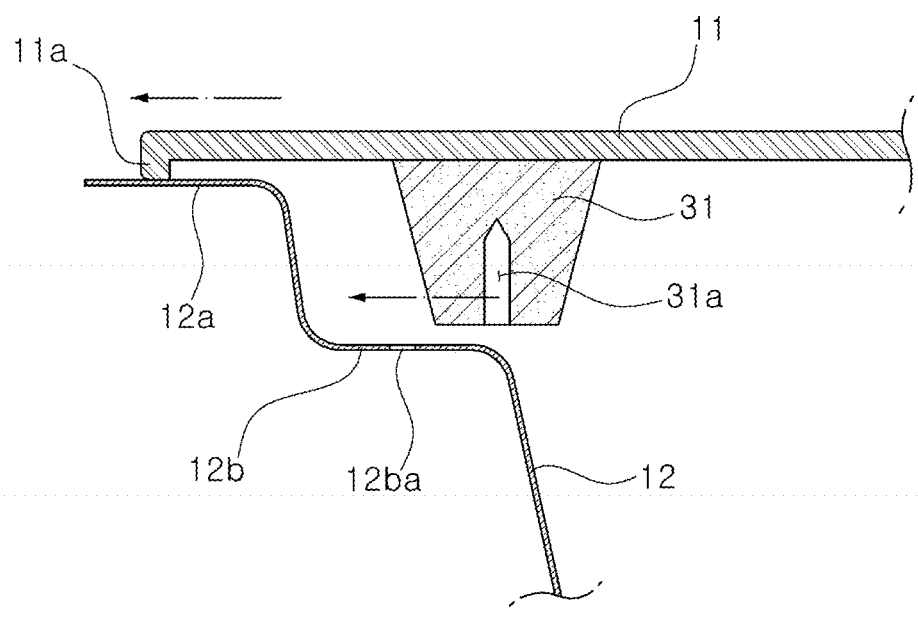
Figure 8C:
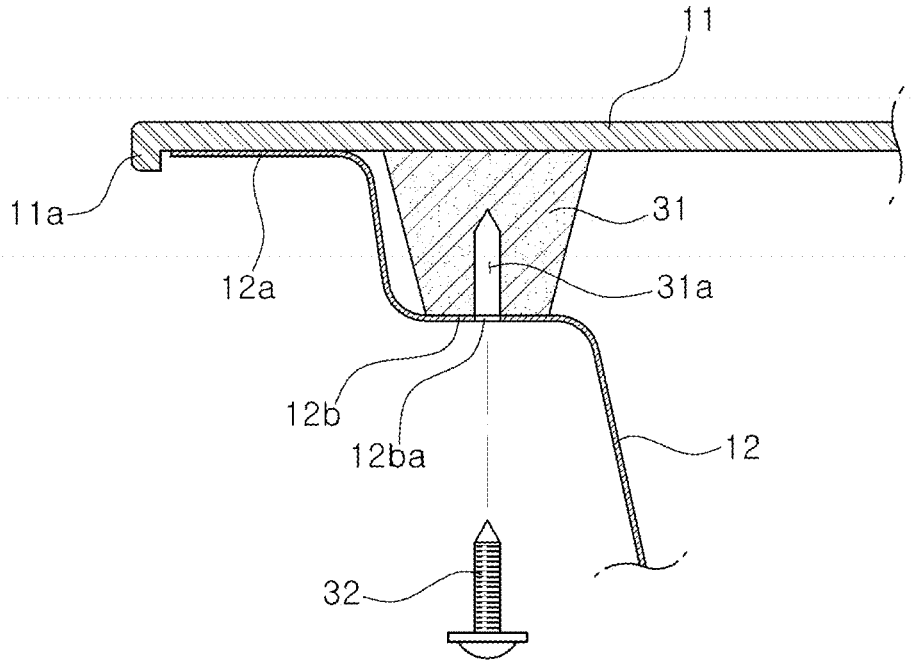
Figure 10B:
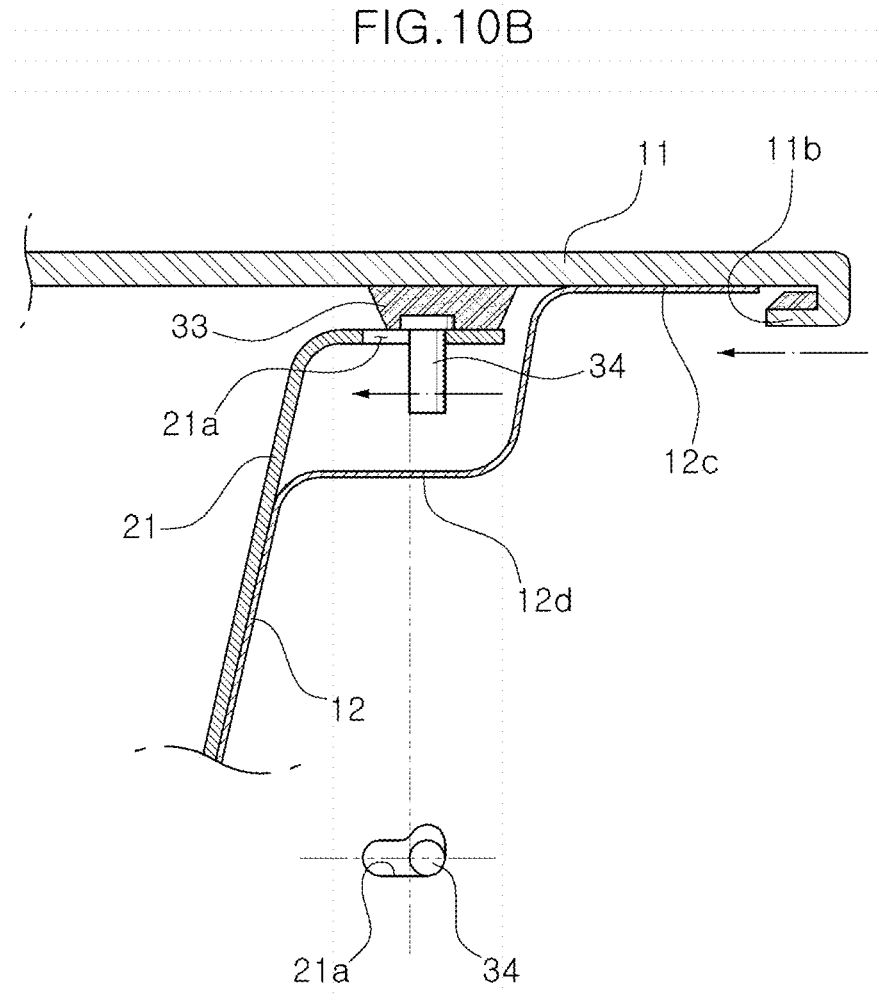
Figure 11:
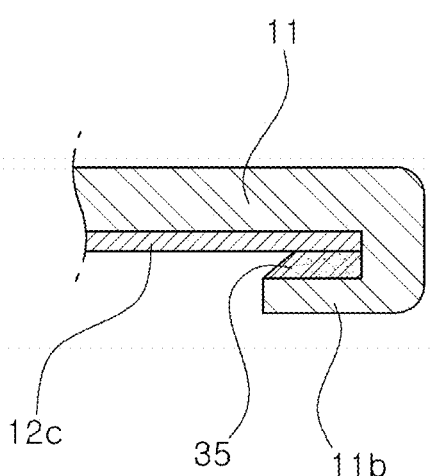
FIG. 11 is a cross-sectional view showing a portion where an external panel grips an internal panel on the other end portion of the door to which the panel fastening structure of the panel door for a vehicle according to an exemplary embodiment of the present disclosure is applied.
Figure 12:
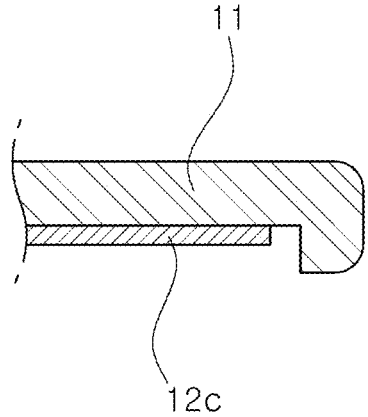
FIG. 12 is a cross-sectional view showing the remaining portions except for the portion where the external panel grips the internal panel on the other end portion of the door to which the panel fastening structure of the panel door for a vehicle according to an exemplary embodiment of the present disclosure is applied.

In the external panel provisional fastening operation S130, the external panel 11 is continuously moved in the width direction of the vehicle, and the external panel 11 is accommodated on the internal panel 12 (see FIGS. 8B and 10B). When the external panel 11 is accommodated on the internal panel 12, the locking jaw 11a is in contact with the front flange 12a, the second touch boss 33 is in contact with the bent portion 12d, and the guide pin 34 passes through the guide hole 21a.

In the external panel moving operation S140, the external panel 11 is moved in the longitudinal direction of the vehicle so that the external panel 11 is positioned at a fastening position with respect to the internal panel 12. For example, when the external panel 11 is moved toward the front of the vehicle, on one side of the door 10, the locking jaw 11a and the end portion of the front flange 12a are in contact with each other, and the first touch boss 31 is in contact with the fastening portion 12b. Furthermore, on the other side of the door 10, the external panel 11 moves forward, the guide pin 34 moves to the front end portion of the guide hole 21a, and the rear flange 12c is inserted into the gripping portion 11b. Because the rear flange 12c is inserted into the gripping portion 11b, the other side of the door 10 is completely fastened.

In the fastening completion operation S150, the external panel 11 and the internal panel 12 are completely fastened by use of the fastening bolt 32. When the fastening bolt 32 passes through the through hole 12ba and is fastened to the fastening hole 31a, fastening is also completed on one side of the door 10, and thus the external panel 11 and the internal panel 12 are completely fastened.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A panel fastening structure of a panel door for a vehicle to which circumferences of an external panel and an internal panel are coupled, the panel fastening structure comprising:
   a fastening member, wherein a first side of the door hinged to a vehicle body includes the external panel and the internal panel fastened by the fastening member, and a second side of the door includes the external panel and the internal panel slidably coupled to each other, wherein a first touch boss is provided to protrude from one side of one of the external panel and the internal panel.

2. The panel fastening structure of claim 1, wherein the fastening member includes a fastening bolt, wherein a through hole is formed in one side of another of the external panel and the internal panel, and wherein the external panel and the internal panel are fastened by the fastening bolt passing through the through hole and fastened to the first touch boss.

3. The panel fastening structure of claim 2, wherein a front flange of the internal panel is formed to be bent to the outside of the vehicle on a portion of the internal panel where the internal panel is fastened to the external panel, wherein a fastening portion of the internal panel is formed stepwise with the front flange from the front flange toward an end of the external panel, wherein the through hole is formed in the fastening portion, and wherein the first touch boss is provided on an internal surface of the external panel.

4. The panel fastening structure of claim 2, wherein on the first side of the door, the external panel and the internal panel are fastened at an interval in a height direction of the vehicle by the fastening bolt.

5. The panel fastening structure of claim 2, wherein a locking jaw protruding toward an interior of the vehicle is formed on one end portion of the external panel, and wherein the external panel and an end portion of the internal panel are fastened to be in contact with the locking jaw.

6. The panel fastening structure of claim 1, wherein a second touch boss is provided to protrude from a side of one of the external panel and the internal panel, wherein a reinforcement member is bonded to a side of another of the external panel and the internal panel, and wherein the reinforcement member is slidably coupled to the second touch boss.

7. The panel fastening structure of claim 6, wherein the reinforcement member is bonded to the internal panel, and a guide hole formed of a slot is formed on the reinforcement member in a longitudinal direction of the vehicle, wherein the second touch boss is formed on the external panel, and wherein a guide pin is fixed to the second touch boss and configured to pass through the guide hole.

8. The panel fastening structure of claim 7, wherein the guide hole is formed lengthily in the longitudinal direction of the vehicle, and a rear end portion of the guide hole is formed to be greater than a diameter of the guide pin.

9. The panel fastening structure of claim 7, wherein a clip configured to elastically support the reinforcement member to the second touch boss is provided on the guide pin.

10. The panel fastening structure of claim 7, wherein a locking protrusion configured to limit a movement of the reinforcement member in an axial direction of the guide pin is provided on the guide pin.

11. The panel fastening structure of claim 2, wherein a rear flange is formed to be bent to the outside of the vehicle on an end portion of the internal panel, wherein a gripping portion configured to grip the rear flange is formed on an end portion of the external panel, and wherein the rear flange is fitted into the gripping portion.

12. The panel fastening structure of claim 11, wherein a rubber configured to allow the rear flange to be in contact with the external panel is provided inside the gripping portion.

13. The panel fastening structure of claim 12, wherein the rubber is formed to be inclined on an inlet side of the gripping portion.

14. The panel fastening structure of claim 11, wherein a protrusion is formed on the rear flange at an interval from the end portion of the internal panel, and wherein a coupling groove coupled to the protrusion is formed inside the gripping portion.

15. The panel fastening structure of claim 11, wherein a stopper is formed to protrude inside the gripping portion and configured to allow the rear flange to be in contact with the external panel.

16. The panel fastening structure of claim 15, wherein a step portion is formed stepwise at an interval on the rear flange.

17. The panel fastening structure of claim 11, wherein the gripping portion is formed at an interval in a height direction of the vehicle.

18. The panel fastening structure of claim 1, wherein the external panel is formed as a plastic panel, and wherein the internal panel is formed as a metal panel.

19. A panel fastening method of a panel door for a vehicle, the method including:

positioning an internal panel at a predetermined position;

moving an external panel in a width direction of the vehicle and loading the external panel to be adjacent to the internal panel;

seating the external panel on the internal panel;

moving the external panel in a longitudinal direction of the vehicle to position the external panel at a fastening position with respect to the internal panel; and fastening one side of the external panel and one side of the internal panel by a fastening member.

* * * * *